United States Patent
Li et al.

(10) Patent No.: US 12,456,491 B2
(45) Date of Patent: Oct. 28, 2025

(54) METHOD AND SYSTEM FOR REALIZING INTELLIGENT MATCHING AND ADDING OF RHYTHMIC TRACKS

(71) Applicant: Harman International Industries, Incorporated, Stamford, CT (US)

(72) Inventors: Dongcheng Li, Guangdong (CN); Qiaoyu Yang, Rochester, NY (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 730 days.

(21) Appl. No.: 17/633,935

(22) PCT Filed: Aug. 7, 2020

(86) PCT No.: PCT/CN2020/107778
§ 371 (c)(1),
(2) Date: Feb. 8, 2022

(87) PCT Pub. No.: WO2021/023296
PCT Pub. Date: Feb. 11, 2021

(65) Prior Publication Data
US 2022/0293134 A1     Sep. 15, 2022

(30) Foreign Application Priority Data
Aug. 8, 2019 (CN) .......................... 201910729601.9

(51) Int. Cl.
*G11B 27/031* (2006.01)
*G06F 16/683* (2019.01)
(Continued)

(52) U.S. Cl.
CPC ......... *G11B 27/031* (2013.01); *G10H 1/0008* (2013.01); *G10H 1/0041* (2013.01);
(Continued)

(58) Field of Classification Search
CPC ...... G10H 1/0008; G10H 1/0041; G10H 1/46; G10H 2210/076; G10H 2240/141; G10H 2240/155; G11B 27/031
(Continued)

(56) References Cited

U.S. PATENT DOCUMENTS

2009/0019995 A1   1/2009 Miyajima
2015/0221297 A1*  8/2015 Buskies ............... G10H 1/0066
                                                      84/611
(Continued)

FOREIGN PATENT DOCUMENTS

CN    108322816 A    7/2018
CN    109584902 A    4/2019
(Continued)

OTHER PUBLICATIONS

Vande Veire, L. et al., "From raw audio to a seamless mix: creating an automated DJ system for Drum and Bass," EURASIP Journal on Audio, Speech, and Music Processing, vol. 2018, No. 1, Dec. 2018, 21 pages.
(Continued)

*Primary Examiner* — Dedei K Hammond
*Assistant Examiner* — Philip G Scoles
(74) *Attorney, Agent, or Firm* — McCoy Russell LLP

(57) ABSTRACT

The present disclosure provides a method and a system for realizing intelligent matching and adding of rhythmic tracks. In one example, a method is provided, including: pre-storing a plurality of music elements; generating a rhythmic track library according to the plurality of music elements, the rhythmic track library including a plurality of rhythmic tracks based on the plurality of music elements; detecting a BPM of original music, and calculating a time interval between every two beats based on the detected BPM of the original music; selecting one or more rhythmic tracks from the rhythmic track library, and assigning a time parameter to the one or more rhythmic tracks based on the time interval so as to match the rhythm of the original music; and adding
(Continued)

Original music

Rhythmic track

After combination the one or more rhythmic tracks assigned with the time parameter into the original music so as to combine with the original music and play.

19 Claims, 5 Drawing Sheets

(51) Int. Cl.
 *G10H 1/00* (2006.01)
 *G10H 1/40* (2006.01)
 *G10H 1/46* (2006.01)
(52) U.S. Cl.
 CPC ......... *G10H 1/46* (2013.01); *G10H 2210/076* (2013.01); *G10H 2240/141* (2013.01); *G10H 2240/155* (2013.01)
(58) Field of Classification Search
 USPC .......................................................... 84/602
 See application file for complete search history.

(56) References Cited

U.S. PATENT DOCUMENTS

| | | |
|---|---|---|
| 2016/0239876 A1 | 8/2016 | Ales |
| 2017/0090860 A1 | 3/2017 | Gehring et al. |
| 2019/0022351 A1* | 1/2019 | McCarthy .............. A61M 21/02 |
| 2020/0089465 A1* | 3/2020 | Wöhst ..................... G06F 3/165 |

FOREIGN PATENT DOCUMENTS

| | | |
|---|---|---|
| EP | 2602786 A2 | 6/2013 |
| JP | H10124078 A | 5/1998 |
| JP | 2000267657 A | 9/2000 |
| JP | 2006267535 A | 10/2006 |
| JP | 2008242037 A | 10/2008 |
| WO | 2007066819 A1 | 6/2007 |
| WO | 2015154159 A1 | 10/2015 |
| WO | 2017212551 A1 | 12/2017 |

OTHER PUBLICATIONS

European Patent Office, Extended European Search Report Issued in Application No. 20851125.3, Aug. 4, 2023, Germany, 10 pages.
ISA National Intellectual Property Administration of the People's Republic of China, International Search Report Issued In Application No. PCT/CN2020/107778, Nov. 13, 2020, WIPO, 2 pages.
Japanese Patent Office, Notice of Allowance Issued in Application No. 2022-505266, Sep. 6, 2024, 5 pages.
State Intellectual Property Office of the People's Republic of China, Office Action and Search Report Issued in Application No. 201910729601.9, Dec. 24, 2024, 16 pages. (Submitted with Machine Translation).

* cited by examiner

METHOD AND SYSTEM FOR REALIZING INTELLIGENT MATCHING AND ADDING OF RHYTHMIC TRACKS

CROSS-REFERENCE TO RELATED APPLICATIONS

The present application is a U.S. National Phase of International Patent Application Serial No. PCT/CN2020/107778 entitled "METHOD AND SYSTEM FOR REALIZING INTELLIGENT MATCHING AND ADDING OF RHYTHMIC TRACKS," filed on Aug. 7, 2020. International Patent Application Serial No. PCT/CN2020/107778 claims priority to Chinese Patent Application No. 201910729601.9 filed on Aug. 8, 2019. The entire contents of each of the above-referenced applications are hereby incorporated by reference for all purposes.

TECHNICAL FIELD

The present disclosure relates to the field of audio, and more specifically to a method and a system for realizing intelligent matching and adding of rhythmic tracks based on original music.

BACKGROUND ART

With the continuous improvement of material life, there are more and more opportunities for people to gather together to hold and participate in parties. Generally, people hope to enliven the atmosphere of a party by adding effects to the music played by an audio system of the party. In order to achieve better results, it often requires very professional personnel (Disc Jockey (DJ)) to control professional equipment (DJ station). But for ordinary users, such professional personnel and professional equipment are often lacking.

At present, the existing smart DJ solution implemented on an audio system can simply perform certain sound effect processing on played original music. FIG. 1 shows a schematic diagram of the existing method for performing sound effect processing on played original music. Referring to FIG. 1, the sound effect processing process is: by reading the played original music, automatically and randomly selecting certain segments of the played original music, and adding some special sound processing effects (such as phase shift and delay). Although this kind of sound processing solution for music realizes automatic sound effect processing without human intervention, it still has the following shortcomings:

a) Since the existing sound effect processing solution can only add the sound processing effect in a random manner, there will be abrupt situations that the sound effect cannot be well integrated with the atmosphere of a scene.

b) The existing sound effect processing solution only performs some simple sound effect processing on part of fragments of the original music, and does not add new music elements to the original music. This causes the effect presented through the sound effect processing to be repeated and monotony.

c) The existing sound effect processing solution can only perform several fixed common effect processing on the original music. Common sound effect processing includes edging/phase shift/delay/chorusing, but these sound effects have completely different styles. Therefore, according to the existing sound effect processing solution, the music style of the processed music will be very indistinct, which cannot bring a good listening experience to users.

Therefore, there is a need for an improved sound effect adding and processing solution to bring a better listening experience to users.

SUMMARY OF THE INVENTION

According to one or more aspects of the present disclosure, a method is provided, including: pre-storing a plurality of music elements; generating a rhythmic track library according to the plurality of music elements, the rhythmic track library including a plurality of rhythmic tracks based on the plurality of music elements; detecting the number of beats per minute (BPM) of original music, and calculating a time interval between every two beats based on the detected BPM of the original music; selecting one or more rhythmic tracks from the rhythmic track library, and assigning a time parameter to the one or more rhythmic tracks based on the time interval so as to match the rhythm of the original music; and adding the one or more rhythmic tracks assigned with the time parameter into the original music so as to combine with the original music and play.

The method provided according to one or more aspects of the present disclosure further includes performing downbeat detection on the original music, and aligning a downbeat of the original music with the first beat of the one or more rhythmic tracks assigned with the time parameter. In the method provided according to one or more aspects of the present disclosure, the plurality of rhythmic tracks in the rhythmic track library are divided into a plurality of groups according to music styles and/or music beat types. In the method provided according to one or more aspects of the present disclosure, the selecting one or more rhythmic tracks from the rhythmic track library includes: determining a music beat type of the original music and/or determining a music style of the original music based on the BPM of the original music; and based on the determined music beat type and/or music style of the original music, selecting one or more rhythmic tracks from at least one of the plurality of groups of the plurality of rhythmic tracks in the rhythmic track library.

In the method provided according to one or more aspects of the present disclosure, the plurality of rhythmic tracks only record the plurality of music elements included and the number of beats between each of the plurality of music elements included and the first music element included. The method provided according to one or more aspects of the present disclosure further includes adding a plurality of rhythmic tracks with different durations into the rhythmic track library. The method provided according to one or more aspects of the present disclosure further includes individually setting a volume for each music element in each rhythmic track.

The method provided according to one or more aspects of the present disclosure further includes: detecting the BPM in real time in the process of playing the original music, and updating the time interval between every two beats according to the latest detected BPM. The method provided according to one or more aspects of the present disclosure further includes: realigning, at a predetermined time interval, the downbeat of the original music with the first beat of the one or more rhythmic tracks assigned with the time parameter.

According to one or more aspects of the present disclosure, a system is provided, including: a memory having a plurality of music elements and a rhythmic track library pre-stored, wherein the rhythmic track library is generated according to the plurality of music elements, and the rhythmic track library includes a plurality of rhythmic tracks based on the plurality of music elements; and a processor configured to: detect the number of beats per minute (BPM) of original music, and calculate a time interval between every two beats based on the detected BPM of the original music; select one or more rhythmic tracks from the rhythmic track library, and assign a time parameter to the one or more rhythmic tracks based on the time interval so as to match the rhythm of the original music; and add the one or more rhythmic tracks assigned with the time parameter into the original music so as to combine with the original music and play.

Another embodiment of the present invention provides a computer-readable medium configured to perform the steps of the method described above.

Advantageously, the method and the system disclosed in the present invention can realize intelligent matching and adding of rhythmic tracks based on original music, so that the added rhythmic tracks can perfectly match the rhythm of the original music. In addition, the method and the system disclosed in the present invention can determine a type of the original music by analyzing the rhythm of the music, and select a rhythmic track matching the corresponding type to add, so as to bring users a harmonious and unified listening effect. Since the number of the rhythmic tracks in the rhythmic track library is large enough, more music elements can be added to the original music, so that users can have a more colorful listening experience.

DESCRIPTION OF THE DRAWINGS

The present disclosure can be better understood by reading the following description of non-limiting implementations with reference to the accompanying drawings. The parts in the figures are not necessarily to scale, but the focus is placed on explaining the principle of the present invention. In addition, in the figures, similar or identical reference numerals refer to similar or identical elements.

DETAILED DESCRIPTION

Figure 1:
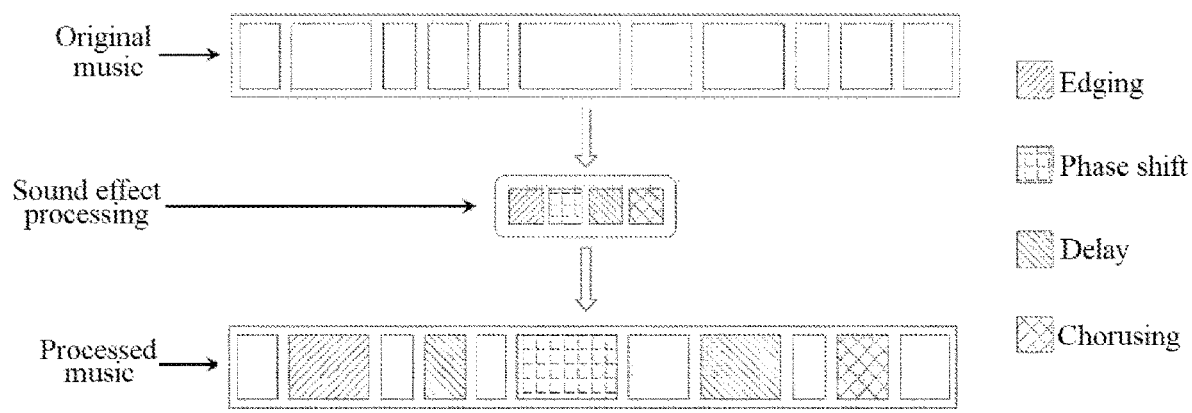
FIG. 1 shows a schematic diagram of the existing method for performing sound effect processing on played original music.

It should be understood that the following description of the embodiments is given for illustrative purposes only, and not restrictive. The division of examples in the functional blocks, modules, or units shown in the drawings should not be construed as representing these functional blocks, and that these modules or units must be implemented as physically separated units. The functional blocks, modules, or units shown or described can be implemented as individual units, circuits, chips, functions, modules, or circuit elements. One or more functional blocks or units can also be implemented in a common circuit, chip, circuit element, or unit.

Any one or more of the processor, memory, or system described herein includes computer-executable instructions that can be compiled or interpreted from computer programs created using various programming languages and/or technologies. Generally speaking, a processor (such as a microprocessor) receives and executes instructions, for example, from a memory, a computer-readable medium, etc. The processor includes a non-transitory computer-readable storage medium capable of executing instructions of a software program. The computer-readable medium can be, but is not limited to, an electronic storage device, a magnetic storage device, an optical storage device, an electromagnetic storage device, a semiconductor storage device, or any suitable combination thereof.

Figure 2:
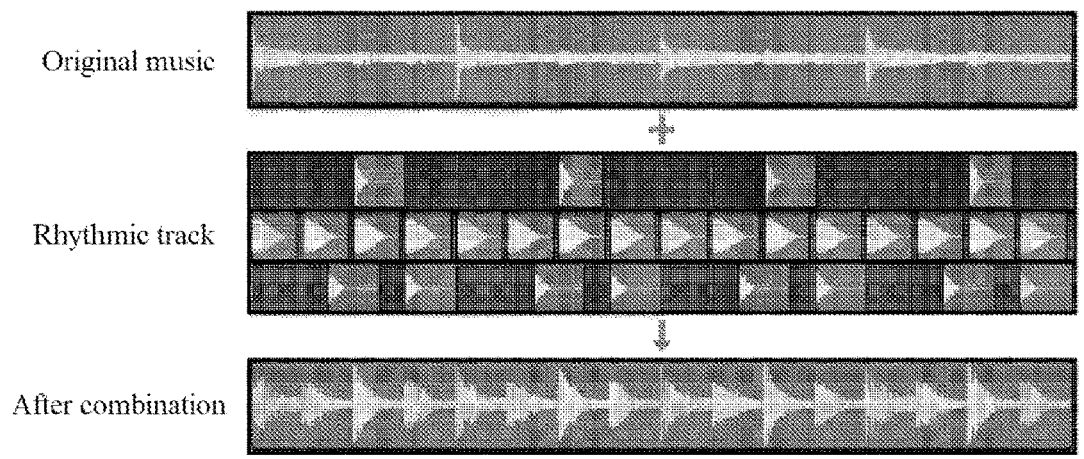
FIG. 2 illustratively shows a schematic diagram of music waveform effects of one or more embodiments of the present invention.

As described above, the present disclosure provides a solution for automatically adapting to original music and adding rhythmic tracks. The solution provided by the present disclosure can enable an audio system to automatically add rhythmic tracks to music being played without human intervention, and ensure that the added rhythmic tracks can well match the rhythm of the original music, while allowing the music after adding and combining sound natural and not abrupt. FIG. 2 illustratively shows a schematic diagram of music waveform effects of one or more solutions disclosed in the present invention.

Figure 3:
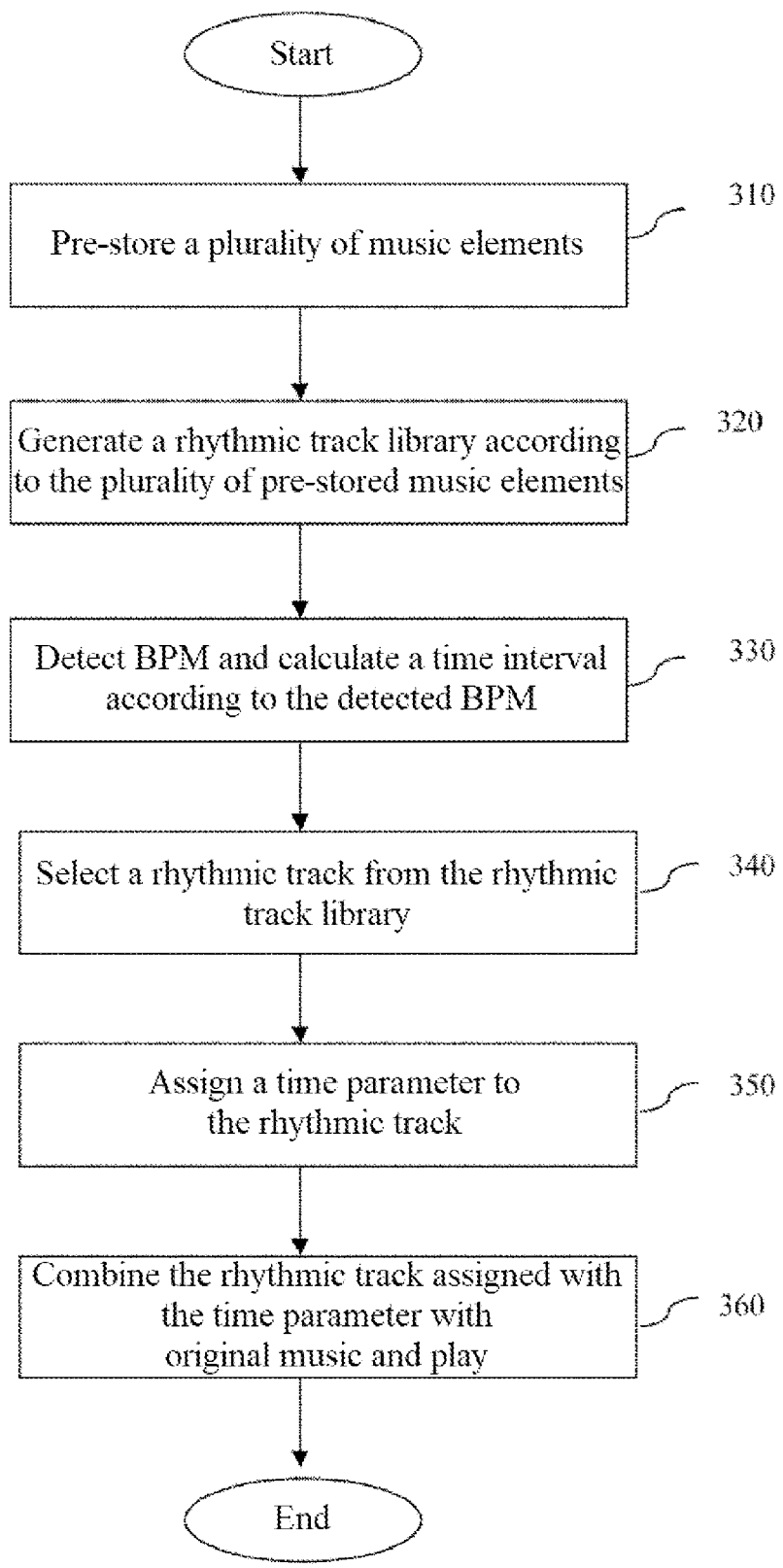
FIG. 3 illustratively shows a method flowchart of an embodiment of the present invention.
Figure 4:
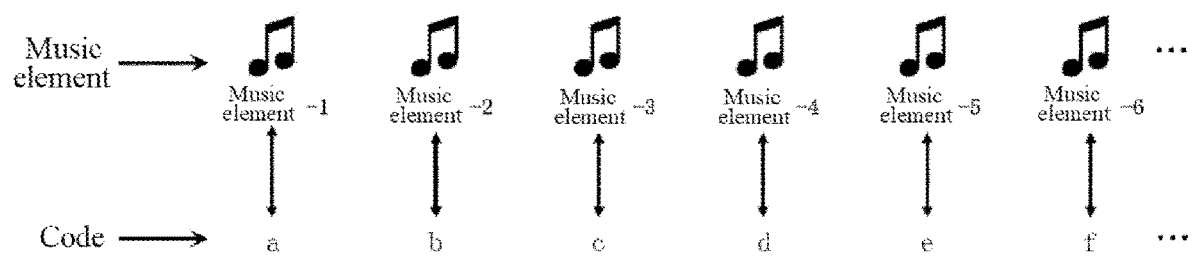
FIG. 4 illustratively shows a schematic diagram of numbering music elements.

FIG. 3 schematically shows a flowchart of a method for realizing intelligent matching and adding of rhythmic tracks based on existing music according to an embodiment of the present invention. As shown in FIG. 3, at step 310, a plurality of music elements are pre-stored. For example, a large number of music elements including multiple instrument sounds are pre-stored, and each music element is numbered (for example, the number is a, b, c, d, e, f, g . . . ) for subsequent use. FIG. 4 schematically shows an example of numbering the music elements.

At step 320, a rhythmic track library is generated according to the plurality of pre-stored music elements, and the rhythmic track library includes a plurality of rhythmic tracks based on the plurality of music elements. For example, the plurality of music elements in the rhythmic track library may be arranged and combined to form the plurality of rhythmic tracks. The rhythmic tracks only record the plurality of music elements included and the number of beats between each of the plurality of music elements included and the first music element included. Table 1 schematically illustrates a schematic arrangement diagram of such rhythmic tracks. As shown in Table 1, the rhythmic tracks only record a sequence of the used music elements in a time order, and do not define time parameters of the rhythmic tracks. In other words, the rhythmic tracks record the number of beats between each music element and the first music element in one track, for example, n0, n1, n2, n3, n4, n5 . . . , and do not record a time interval of every two beats.

In order to facilitate better understanding, the following takes the rhythmic track 1 in Table 1 as an example for illustration.

TABLE 1

| Bar | 1 | | | | | | | | | | | | | | | |
|---|---|---|---|---|---|---|---|---|---|---|---|---|---|---|---|---|
| Beat | 1 | | | | 2 | | | | 3 | | | | 4 | | | |
| ¼ Beat | 1 | 2 | 3 | 4 | 1 | 2 | 3 | 4 | 1 | 2 | 3 | 4 | 1 | 2 | 3 | 4 |
| Rhythmic track1 | b, f | | o, p | | b | c, j, o, p | | | | | | | b, i | | | |
| Rhythmic track2 | l, m | | | | 1 | | | | | b, l | | | 1 | | | |

TABLE 1-continued

| | | | | | | | | |
|---|---|---|---|---|---|---|---|---|
| Rhythmic track3 | o | | k | e | | m, o, q | | |
| Rhythmic track4 | g, l | l | n | a | n | o | o | n |
| . | | | | | | | | |
| . | | | | | | | | |
| . | | | | | | | | |
| Rhythmic trackn | l, m | | l | b, l | | l | | |

As shown in Table 1, the rhythmic track 1 includes a plurality of music elements (b, f, o, p, c, j, o, p, b, i). The music element b,f is arranged in order as the first music element (n0=0 beat); the interval between the music element o,p and the first music element is n1=0.5 beat; the interval between the music element b and the first music element is n2=1 beat; the interval between the music element c,j,o,p and the first music element is n3=1.5 beats; and the interval between the music element b,i and the first music element is n4=2 beats. That is to say, the rhythmic track in the rhythmic track library generated at step 320 may only record the plurality of music elements included as well as the number of beats between each of the plurality of music elements included and the first music element included.

At step 330, the number of beats per minute (BPM) of the original music is detected, and the time interval (t_beat) between every two beats is calculated based on the detected BPM of the original music. For illustrative purposes, the following description only takes music of 4/4 beats as an example. Those skilled in the art can understand that various embodiments of the present disclosure can be applied to music of various beats. For example, taking the music of 4/4 beats as an example, the time interval between every two beats of the original music can be calculated from the detected BPM of the original music as t_beat=60/BPM. For example, if the detected BPM of the original music is 120, the time interval t_beat=60/120=0.5 s.

At step 340, one or more rhythmic tracks are selected from the rhythmic track library. In step 350, based on the time interval, a time parameter is assigned to the one or more rhythmic tracks to match the rhythm of the original music. For example, after the time interval t_beat is obtained, time parameters are assigned to the rhythmic tracks, t1=n1*t_beat, t2=n2*t_beat, t3=n3*t_beat. . . . Still taking the original music of 4/4 beats as an example, assuming the BPM of the original music is 120, then t_beat=0.5 s. Then, for example, the rhythmic track 1 in Table 1 can be assigned with the following time parameters:

t0=0 s; t1=n1*t_beat=0.5*0.5=0.25 s; t2=0.5 s; t3=0.75 s; and t4=1 s.

Thus, based on the above-mentioned time interval, time parameters are assigned to the plurality of music elements in the rhythmic tracks so as to match the rhythm of the original music.

Next, the processing flow of the method proceeds to step 360. At step 360, the one or more rhythmic tracks assigned with the time parameter are added into the original music so as to combine with the original music and play. The above-mentioned method shown in FIG. 3 can realize intelligent matching and adding of rhythmic tracks based on original music, so that the added rhythmic tracks can perfectly match the rhythm of the original music, and bring a better listening experience to users.

Figure 5:
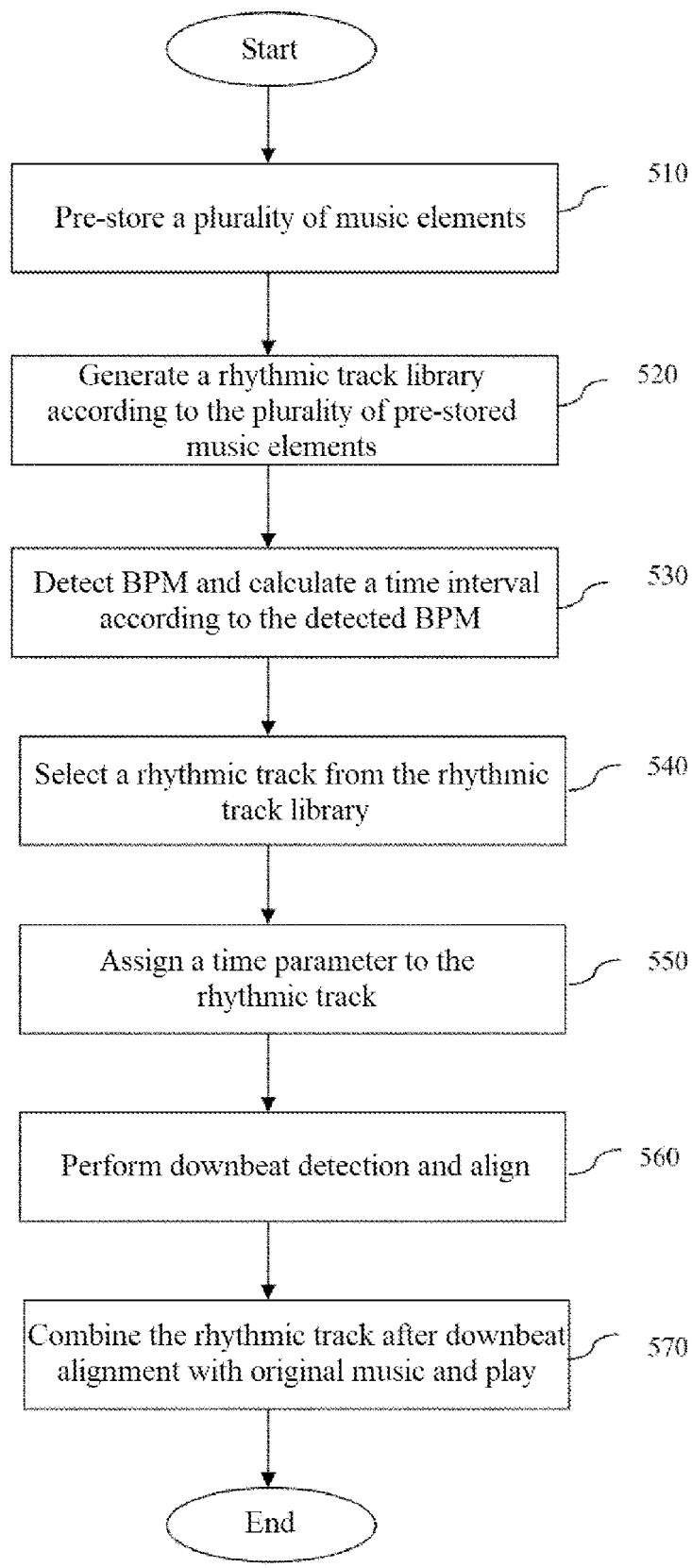
FIG. 5 illustratively shows a method flowchart of another embodiment of the present invention.

FIG. 5 schematically shows a flowchart of a method for realizing intelligent matching and adding of rhythmic tracks based on existing music according to another embodiment of the present invention. As shown in FIG. 5, at step 510, a plurality of music elements are pre-stored. At step 520, a rhythmic track library is generated according to the plurality of music elements, wherein the rhythmic track library includes a plurality of rhythmic tracks based on the plurality of music elements. At step 530, the beat per minute (BPM) of original music is detected, and a time interval between every two beats is calculated based on the detected BPM of the original music. At step 540, one or more rhythmic tracks are selected from the rhythmic track library. At step 550, a time parameter is assigned to the one or more rhythmic tracks based on the time interval to match the rhythm of the original music. The above steps 510-550 are similar to steps 310-350 in FIG. 3, so the foregoing related descriptions about steps 310-350 in FIG. 3 are also applicable to steps 510-550 in FIG. 5. The description will not be repeated here.

Figure 6:
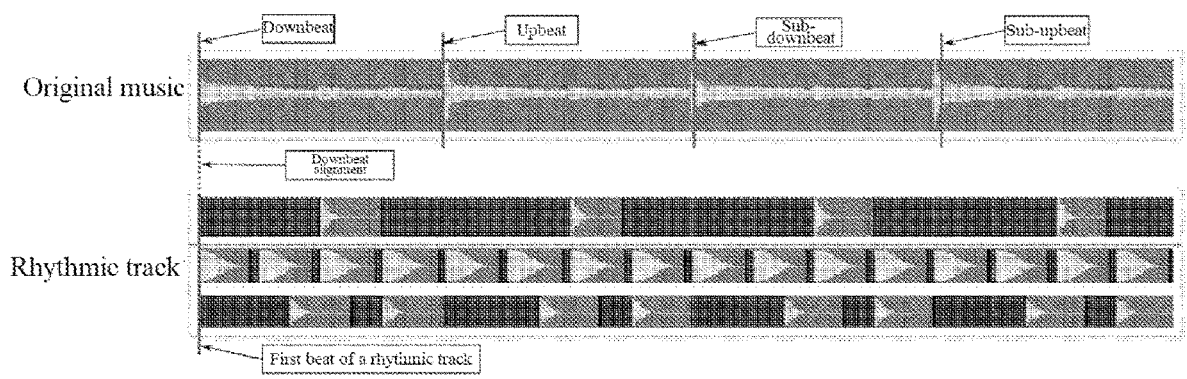
FIG. 6 illustratively shows a schematic diagram of aligning a downbeat of original music with the first beat of a rhythmic track.

In the present embodiment, in the next step 560, downbeat detection is performed on the original music, and a downbeat of the original music is aligned with the first beat of the one or more rhythmic tracks assigned with the time parameter. For example, a processor can analyze the beat of the original music at regular intervals (for example, 0.5S, etc.) to detect downbeats. FIG. 6 illustratively shows a schematic diagram of aligning a downbeat of original music with the first beat of a rhythmic track. Similarly, for illustrative purposes only, FIG. 6 only uses music of 4/4 beats as an example for schematic representation. Those skilled in the art can understand that the embodiments of the present disclosure can be applied to original music of various beats.

Next, in step 570, the one or more rhythmic tracks that have been subjected to downbeat alignment are added into the original music so as to combine with the original music and play.

In one or more embodiments of the present invention, preferably, the plurality of rhythmic tracks in the rhythmic track library can be divided into a plurality of groups, for example, divided into a plurality of groups according to music styles and/or music beat types. In addition, the BPM range value of the original music can be roughly classified according to the difference in BPM ranges, and then is made correspond to the plurality of groups in the rhythmic track library in an adaptive manner. For better explanation, Table 2 below illustratively gives an example of grouping music according to music styles.

TABLE 2

| BPM value range | Style | Rhythmic track group |
|---|---|---|
| Range 01 (≤a) | A | Group 1 |
| Range 02 (>a& ≤ b) | B | Group 2 |
| Range 03 (>b& < c) | C | Group 3 |
| Range 04 (≥c) | D | Group 4 |

For example, classification may be performed according to the range of the BPM values of the original music. When the BPM value is less than or equal to value a, it can be determined that the music style of the original music belongs to "Style A", then when selection is made from the plurality of rhythmic tracks in the rhythmic track library, one or more rhythmic tracks can be selected from the corresponding group "Group 1" in the rhythmic track library based on the determined music style A of the original music. The rest can be done in the same manner.

By determining the BPM style classification of the original music above and then making it correspond to the rhythmic tracks of different groups in an adaptive manner, the style of the original music may be kept consistent with the style of the rhythmic tracks when the rhythmic tracks are added, thereby bringing users a more pleasant listening experience.

In addition, in various embodiments of the present disclosure, a plurality of rhythmic tracks with different durations may also be added into the rhythmic track library. The numbers of looping bars in these rhythmic tracks with different durations are different. For example, some rhythmic tracks are looped in unit of 1 bar, and some rhythmic tracks are looped in unit of 2 bars. In this way, the added rhythmic tracks can be richer and can be changed randomly, so that users can have a better listening experience while maintaining feeling of freshness for the function.

Furthermore, in various embodiments of the present disclosure, a volume can also be individually set for each music element in each rhythmic track. As a result, even the same music element can be called at different volumes in different rhythmic tracks, so that the rhythmic prominence degrees of the rhythmic tracks in the original music can be adjusted.

In addition, since the BPM of the original music will change in the playing process, in order to correct the own errors in the music playing process, the method of the present disclosure can also use a processor of an audio system to detect the BPM of the original music in real time (or may detect at a predetermined time interval) in the music playing process, and adjust and update the time interval (t_beat) between every two beats according to the latest detected BPM. For example, the processor may detect and analyze the BPM of the original music every 0.5 s and adjust to update time interval t_beat based on the latest detected BPM.

Similarly, the downbeat of the original music may further be realigned, by the processor of the audio system, with the first beat of the one or more rhythmic tracks assigned with the time parameter at a predetermined time interval, so as to eliminate the error superposition of detection and calculation. For example, the processor may perform a downbeat alignment operation at a time interval in unit of bars.

The present disclosure further provides a system, which includes a memory and a processor. The memory is used to pre-store a plurality of music elements and a rhythmic track library. The rhythmic track library is generated based on the plurality of music elements, and the rhythmic track library includes a plurality of rhythmic tracks based on the plurality of music elements. The processor is configured to: detect a BPM of original music, and calculate a time interval between every two beats based on the detected BPM of the original music; select one or more rhythmic tracks from the rhythmic track library, and assign a time parameter to the one or more rhythmic tracks based on the time interval so as to match the rhythm of the original music; and add the one or more rhythmic tracks assigned with the time parameter into the original music so as to combine with the original music and play.

The method and the system for realizing intelligent matching and adding of rhythmic tracks based on original music according to the implementations of the present disclosure have achieved improved effects. The method and the system of the present disclosure can use basic music elements to generate rhythmic tracks, and the rhythmic tracks can well match the beat and style of the original music. For the original music, due to the addition of the new music elements, the music played after combination can have rich sound effects. In addition, the rhythmic tracks in the solution of the present disclosure only record the plurality of music elements included and the number of beats between each of the plurality of music elements included and the first music element included. That is to say, the memory only needs to store combination arrangement codes of the music elements, and the processor assigns the time parameters to the music elements in the codes according to the calculated time intervals to form the various rich rhythmic tracks. Therefore, in theory, only a small number of music elements may be used to generate a large number of rhythmic tracks, and only a small amount of memory space is required. The implementation of realizing intelligent matching and adding of rhythmic tracks based on original music of the present disclosure greatly improves the user experience.

The description of the implementations has been presented for the purposes of illustration and description. Appropriate modifications and changes of the implementations can be implemented in view of the above description or can be obtained through practical methods. For example, unless otherwise indicated, one or more of the methods described may be performed by a combination of suitable devices and/or systems. The method can be performed in the following manner: using one or more logic devices (for example, processors) in combination with one or more additional hardware elements (such as storage devices, memories, circuits, hardware network interfaces, etc.) to perform stored instructions. The method and associated actions can also be executed in parallel and/or simultaneously in various orders other than the order described in this application. The system is illustrative in nature, and may include additional elements and/or omit elements. The subject matter of the present disclosure includes all novel and non-obvious combinations of the disclosed various methods and system configurations and other features, functions, and/or properties.

As used in this application, an element or step listed in the singular form and preceded by the word "one/a" should be understood as not excluding a plurality of said elements or steps, unless such exclusion is indicated. Furthermore, references to "one implementation" or "an example" of the present disclosure are not intended to be interpreted as excluding the existence of additional implementations that also incorporate the recited features.

The invention claimed is:

1. A method for realizing intelligent matching and adding of rhythmic tracks, comprising:
   pre-storing a plurality of music elements;
   generating a rhythmic track library according to the plurality of music elements, the rhythmic track library comprising a plurality of rhythmic tracks based on the plurality of music elements;
   detecting a number of beats per minute (BPM) of an original music, and calculating a time interval between every two beats based on the detected BPM of the original music;
   selecting one or more rhythmic tracks from the rhythmic track library, and assigning a time parameter to the one or more rhythmic tracks based on the time interval so as to match a rhythm of the original music;
   adding the one or more rhythmic tracks assigned with the time parameter into the original music so as to combine with the original music and play, wherein each of the one or more of rhythmic tracks only records the plurality of music elements included in the rhythmic track, and the number of beats between each of the plurality of music elements and a first music element included in the rhythmic track.

2. The method according to claim 1, wherein the plurality of rhythmic tracks in the rhythmic track library are divided into a plurality of groups according to music styles, music beat types, or both.

3. The method according to claim 2, wherein the selecting one or more rhythmic tracks from the rhythmic track library comprises:
determining a music beat type of the original music, a music style of the original music, or both, based on the detected BPM of the original music; and
based on the determined music beat type of the original music, the determined music style of the original music, or both, selecting one or more rhythmic tracks from at least one of the plurality of groups of the plurality of rhythmic tracks in the rhythmic track library.

4. The method according to claim 1, wherein the method further comprises adding a plurality of rhythmic tracks with different durations into the rhythmic track library.

5. The method according to claim 1, wherein the method further comprises individually setting a volume for each music element in each rhythmic track.

6. The method according to claim 1, further comprising realigning a downbeat of the original music out at a predetermined time interval, and wherein the predetermined time interval is a unit of bars.

7. A system for realizing intelligent matching and adding of rhythmic tracks, comprising:
a memory having a plurality of music elements and a rhythmic track library pre-stored, wherein the rhythmic track library is generated according to the plurality of music elements, and the rhythmic track library comprises a plurality of rhythmic tracks based on the plurality of music elements; and
a processor configured to:
detect a number of beats per minute (BPM) of an original music, and calculate a time interval between every two beats based on the detected BPM of the original music;
select one or more rhythmic tracks from the rhythmic track library, and assign a time parameter to the one or more rhythmic tracks based on the time interval so as to match a rhythm of the original music;
add the one or more rhythmic tracks assigned with the time parameter into the original music so as to combine with the original music and play;
perform downbeat detection on the original music, and aligning a downbeat of the original music with a first beat of the one or more rhythmic tracks assigned with the time parameter;
detect the BPM in real time in the process of playing the original music, and update the time interval between every two beats according to a latest detected BPM, wherein updating the time interval includes dividing the BPM of the original music by the latest detected BPM of the original music; and
realign the downbeat of the original music with the first beat of the one or more rhythmic tracks assigned with the time parameter.

8. The system according to claim 7, wherein the plurality of rhythmic tracks in the rhythmic track library are divided into a plurality of groups according to music styles, music beat types, or both.

9. The system according to claim 8, wherein the processor is further configured to:
determine a music beat type of the original music, a music style of the original music, or both, based on the detected BPM of the original music; and
based on the determined music beat type of the original music, the determined music style of the original music, or both, select one or more rhythmic tracks from at least one of the plurality of groups of the plurality of rhythmic tracks in the rhythmic track library.

10. The system according to claim 7, wherein the plurality of rhythmic tracks only record the plurality of music elements comprised, a number of beats between each of the plurality of music elements comprised, and a first music element comprised.

11. The system according to claim 7, wherein the memory further stores a plurality of rhythmic tracks with different durations in the rhythmic track library.

12. The system according to claim 7, wherein the processor is further configured to individually set a volume for each music element in each rhythmic track.

13. The system according to claim 7, wherein the processor is further configured to detect the BPM in real time in the process of playing the original music.

14. The system according to claim 7, wherein the downbeat of the original music is realigned with the first beat of the one or more rhythmic tracks assigned with the time parameter at a predetermined time interval.

15. A computer-readable medium comprising instructions, wherein the instructions can execute the method according to claim 1, and wherein the instructions are further executable to:
for each beat of a bar, assign the time parameter to the rhythmic track by multiplying the beat by the calculated time interval.

16. The method according to claim 1, wherein the one or more rhythmic tracks are separated into multiple groups based on a BPM range for the one or more rhythmic tracks.

17. The method according to claim 1, wherein the BPM of the original music changes during the process of playing the original music, and wherein detecting the BPM in real time in the process of playing the original music and updating the time interval between every two beats according to the latest detected BPM corrects for the changes during the process of playing the original music.

18. The method according to claim 1, wherein detecting the BPM in real time in the process of playing the original music includes analyzing the BPM of the original music at regular predetermined time intervals.

19. The method according to claim 1, wherein the time interval between every two beats is detected in the original music, and wherein the time interval between every two beats is not detected in the rhythmic track.

* * * * *